US010546014B2

(12) United States Patent
Han et al.

(10) Patent No.: US 10,546,014 B2
(45) Date of Patent: *Jan. 28, 2020

(54) SYSTEMS AND METHODS FOR SEGMENTING MEDICAL IMAGES BASED ON ANATOMICAL LANDMARK-BASED FEATURES

(71) Applicant: ELEKTA, INC., Atlanta, GA (US)

(72) Inventors: Xiao Han, Chesterfiled, MO (US); Yan Zhou, Saint Peters, MO (US)

(73) Assignee: Elekta, Inc., Atlanta, GA (US)

( * ) Notice: Subject to any disclaimer, the term of this patent is extended or adjusted under 35 U.S.C. 154(b) by 273 days.

This patent is subject to a terminal disclaimer.

(21) Appl. No.: 15/654,768

(22) Filed: Jul. 20, 2017

(65) Prior Publication Data

US 2017/0322950 A1 Nov. 9, 2017

Related U.S. Application Data

(63) Continuation of application No. 14/474,407, filed on Sep. 2, 2014, now Pat. No. 9,740,710.

(51) Int. Cl.
*G06K 9/00* (2006.01)
*G06F 16/583* (2019.01)
(Continued)

(52) U.S. Cl.
CPC ......... *G06F 16/583* (2019.01); *G06K 9/4604* (2013.01); *G06K 9/6269* (2013.01);
(Continued)

(58) Field of Classification Search
None
See application file for complete search history.

(56) References Cited

U.S. PATENT DOCUMENTS 7,804,990 B2  9/2010 Kiraly
8,150,498 B2  4/2012 Gielen et al.
(Continued)

FOREIGN PATENT DOCUMENTS

AU  2015312327 A1  3/2017
EP  3195257 A1  7/2017
(Continued)

OTHER PUBLICATIONS

"Australian Application Serial No. 2015312327, First Examination Report dated Dec. 11, 2018", 4 pgs.
(Continued)

*Primary Examiner* — Soo Jin Park
(74) *Attorney, Agent, or Firm* — Schwegman Lundberg & Woessner, P.A.; Sanjay Agrawal

(57) ABSTRACT

The present disclosure relates to systems, methods, and computer-readable storage media for segmenting medical images. Embodiments of the present disclosure may relate to a method for segmenting medical images. The method may be implemented by a processor device executing a plurality of computer executable instructions. The method may comprise receiving an image from a memory, and identifying at least one landmark point within the image. The method may further comprise selecting an image point in the image, and determining at least one feature for the image point relative to the at least one landmark point. The method may also comprise associating the image point with an anatomical structure by using a classification model based on the at least one determined feature.

17 Claims, 11 Drawing Sheets

(51) Int. Cl.
G06K 9/46 (2006.01)
G06K 9/62 (2006.01)
G06T 7/10 (2017.01)
G06T 7/11 (2017.01)

(52) U.S. Cl.
CPC .................. *G06T 7/10* (2017.01); *G06T 7/11* (2017.01); *G06T 2207/20081* (2013.01); *G06T 2207/30081* (2013.01)

(56) References Cited

U.S. PATENT DOCUMENTS

| | | | |
|---|---|---|---|
| 8,721,077 | B2 | 5/2014 | Vermeer |
| 9,740,710 | B2 | 8/2017 | Han et al. |
| 2004/0153128 | A1 | 8/2004 | Suresh |
| 2005/0018890 | A1 | 1/2005 | McDonald |
| 2005/0169536 | A1 | 8/2005 | Accomazzi |
| 2005/0237336 | A1 | 10/2005 | Guhring |
| 2008/0137923 | A1 | 6/2008 | Spahn |
| 2012/0002855 | A1 | 1/2012 | Bai |
| 2016/0063720 | A1 | 3/2016 | Han et al. |

FOREIGN PATENT DOCUMENTS

| | | | |
|---|---|---|---|
| JP | 11213127 | A | 8/1999 |
| JP | 11276462 | A | 10/1999 |
| JP | 2011177517 | A | 9/2011 |
| JP | 2012522557 | A | 9/2012 |
| JP | 2012533331 | A | 12/2012 |
| JP | 6514325 | B2 | 4/2019 |
| RU | 2017110538 | A | 10/2018 |
| WO | WO-2016036516 | A1 | 3/2016 |

OTHER PUBLICATIONS

"European Application Serial No. 15763677.0, Response filed Oct. 18, 2017 to Communication pursuant to Rules161(1) and 162 EPC dated Apr. 11, 2017", 19 pgs.
"Japanese Application Serial No. 2017-512347, Office Action mailed Oct. 2, 2018", w/ English translation, 5 pgs.
Cootes, T.F. et al., "The Use of Active Shape Models for Locating Structures in Medical Images," Information Processing in Medical Imaging (Jun. 1993) pp. 33-47.
Dwarikanath Mahaptra et al., "Localizing and Segmenting Crohn's Disease Affected Regions in Abnormal MRI Using Novel Context Features," Proceedings of SPIE, vol. 8669 (Mar. 2013) pp. 1-8.
Hongwei Ji et al., "ACM-Based Automatic Liver Segmentation From 3-D CT Images by Combining Multiple Atlases and Improved Mean-Shift Techniques," IEEE Journal of Biomedical and Health Informatics, vol. 17, No. 3, (May 2013) pp. 690-698.
International Search Report and Written Opinion in corresponding PCT Application No. PCT/US2015/046011 dated Aug. 20, 2015 (13 pages).
Wei Li et al., "Paper; Learning Image Context for Segmentation of the Prostate in CT-guided Radiotherapy," Phys. Med. Biol., vol. 57 (2012) pp. 1283-1308.
Zhuowen Tu et al., "Auto-Context and Its Application to High-Level Vision Tasks and 3D Brain Image Segmentation," IEEE Transactions on Pattern Analysis and Machine Intelligence, vol. 32, No. 10 (Oct. 2010) pp. 1744-1757.
"U.S. Appl. No. 14/474,407, Examiner Interview Summary dated Nov. 23, 2016", 3 pgs.
"U.S. Appl. No. 14/474,407, Final Office Action dated Apr. 6, 2016", 14 pgs.
"U.S. Appl. No. 14/474,407, Non Final Office Action dated Sep. 20, 2016", 15 pgs.
"U.S. Appl. No. 14/474,407, Non Final Office Action dated Nov. 13, 2015", 14 pgs.
"U.S. Appl. No. 14/474,407, Notice of Allowance dated Apr. 25, 2017", 8 pgs.
"U.S. Appl. No. 14/474,407, Response filed Feb. 1, 2016 to Non Final Office Action dated Nov. 13, 2015", 17 pgs.
"U.S. Appl. No. 14/474,407, Response filed Aug. 3, 2016 to Final Office Action dated Apr. 6, 2016", 18 pgs.
"U.S. Appl. No. 14/474,407, Response filed Nov. 30, 2016 to Non Final Office Action dated Sep. 20, 2016", 19 pgs.
"International Application Serial No. PCT/US2015/046011, International Preliminary Report on Patentability dated Mar. 16, 2017", 10 pgs.
"Japanese Application Serial No. 2017-512347, Response Filed Dec. 25, 2018 to Office Action dated Oct. 2, 2018", w/English Claims, 20 pgs.
"Australian Application Serial. No. 2015312327, Response filed Apr. 23, 2016 to Second Examiners Report dated Apr. 17, 2019", 24 pgs.
"Australian Application Serial No. 2015312327, Second Examiners Report dated Apr. 17, 2019", 5 pgs.
"Russian Application Serial No. 2017110538, Office Action dated Mar. 14, 2019", w/ English Translation, 22 pgs.
"Russian Application Serial No. 2017110538, Response filed Jun. 14, 2019 to Office Action dated Mar. 14, 2019", w/ English claims, 29 pgs.
Kosykh, N. E, et al., "The system of automated computer analysis of medical images", Bioinformatics and Medicine, (Mar. 2011), 12 pgs.
Soloduchkin, A. I, et al., "Modified Algorithm for Calculating the Field of Displacement Vectors to Estimate the Deformation", News of Tomsk Polytechnic University, Tomsk, 318(5), (2011), 5 pgs.

SYSTEMS AND METHODS FOR SEGMENTING MEDICAL IMAGES BASED ON ANATOMICAL LANDMARK-BASED FEATURES

This is a continuation of application Ser. No. 14/474,407, filed Sep. 2, 2014, which is incorporated herein by reference in its entirety.

TECHNICAL FIELD

This disclosure relates generally to medical image segmentation. More specifically, this disclosure relates to systems and methods for automated medical image segmentation based on learning algorithms using features extracted relative to anatomical landmarks.

BACKGROUND

Image segmentation techniques are widely used for segmenting medical images and determining contours between anatomical structures within the images. For example, in radiation therapy, automatic segmentation of organs is usually performed to reduce contouring time, and improve contour accuracy and consistency over various hospitals. However, automated segmentation remains to be a very difficult task on medical images having lower image quality, such as some computer tomography (CT) or cone-beam computer tomography (CBCT) images that may be used to treat cancer patients. For example, such CT or CBCT images are known to have lower contrast and little textures for most soft tissue structures. Therefore, conventional image segmentation methods based primarily on image contrast often fail to find an accurate contour between the background and anatomical structures (e.g., organs or tumors) of interest, or between different anatomical structures in a medical image.

FIG. 1 illustrates an exemplary three-dimensional (3D) CT image from a typical prostate cancer patient. Illustration (A) shows a pelvic region of the patient in a 3D view, which includes the patient's bladder, prostate, and rectum. Images (B), (C), and (D) are axial, sagittal and coronal views from a 3D CT image of this pelvic region. As shown in images (B), (C), and (D), most part of the patient's prostate boundary is not visible. That is, one cannot readily distinguish the prostate from other anatomical structures or determine a contour for the prostate. In comparison, images (E), (F), and (G) show the expected prostate contour on the same 3D CT image. Therefore, conventional image segmentation methods based on solely the contrast and textures presented in the image will likely fail when used to segment this exemplary 3D CT image.

Recent developments in machine learning techniques make improved image segmentation on lower quality images possible. For example, supervised learning algorithms can "train" the machines or computers to predict which anatomical structure each pixel or voxel of a medical image should belong to. Such prediction usually uses features of the pixel or voxel as inputs. Therefore, the performance of the segmentation highly depends on the type of features available. To date, most learning-based image segmentation methods are based primarily on local image features such as image intensities, image textures, etc. As a result, these segmentation methods are still suboptimal for lower quality images, such as the 3D CT image shown in FIG. 1.

Accordingly, there is a need to design more appropriate features for learning-based auto-segmentation methods in order to improve segmentation performance on medical images in radiation therapy or related fields.

SUMMARY

Certain embodiments of the present disclosure relate to a method for segmenting medical images. The method may be implemented by a processor device executing a plurality of computer executable instructions. The method may comprise receiving an image from a memory, and identifying at least one landmark point within the image. The method may further comprise selecting an image point in the image, and determining at least one feature for the image point relative to the at least one landmark point. The method may also comprise associating the image point with an anatomical structure by using a classification model based on the at least one determined feature.

Certain embodiments of the present disclosure relate to another method for segmenting medical images. The method may be implemented by a processor device executing a plurality of computer executable instructions. The method may comprise receiving an image from a memory location, and identifying at least one landmark point in the image. The method may further comprise selecting an image point in the image, and determining at least one feature for the image point relative to the at least one landmark point. The method may further comprise extracting at least one of an image texture, an image patch from the image, or combinations thereof. The method may also comprise associating the image point with an anatomical structure by using a classification model based on the at least one determined feature and at least one of the extracted image texture, the extracted image patch, and combinations thereof.

Certain embodiments of the present disclosure relate to a non-transitory computer-readable medium storing computer-executable instructions. When executed by a computer, the computer-executable instructions may cause the computer to perform an operation for training a classification model used for segmenting medical images. The computer-executable instructions may comprise instructions for receiving a training image, the training image including a plurality of image points and each image point within the training image is assigned an anatomical structure. The computer-executable instructions may further comprise instructions for identifying at least one landmark point in the training image, and determining one or more features for each image point in the training image relative to the landmark point. The computer-executable instructions may also comprise instructions for using the plurality of image points as training data to train the classification model. The classification model associates an unclassified image point with an anatomical structure based on the one or more determined features for the unclassified image point.

Certain embodiments of the present disclosure relate to a non-transitory computer-readable storage medium storing computer-executable instructions. The computer-executable instructions, when executed by a computer, may cause the computer to perform an operation for segmenting medical images using a classification model. The computer-executable instructions may comprise instructions for receiving an image from a memory location, and identifying at least one landmark point within the image. The computer-executable instructions may further comprise instructions for selecting an image point in the image, and determining at least one feature for the image point relative to the landmark point. The computer-executable instructions may also comprise instructions for associating the image point with an anatomical structure by using the classification model, based on the at least one determined feature.

Certain embodiments of the present disclosure relate to a system for training a classification model used for segmenting medical images. The system may comprise a database configured for storing a plurality of training images, each training image including a plurality of image points and each image point is assigned an anatomical structure. The system may further comprise a training unit connected to the database to access the plurality of training images. The training unit may comprise a feature extraction module and a classifier training module. The feature extraction module may be configured to receive a training image from the database. The training image include a plurality of image points and each image point within the training image is assigned an anatomical structure. The feature extraction module may be further configured to identify at least one landmark point in the training image comprise. The feature extraction module may also be configured to determine one or more features for each image point in the training image relative to the landmark point. The classifier training module may configured to use the plurality of image points as training data to train the classification model. The classification model associates an unclassified image point with an anatomical structure based on the one or more determined features for the unclassified image point.

Certain embodiments of the present disclosure relate to a system for segmenting medical images using a classification model. The system may comprise a database configured for storing a plurality of images. The system may further comprise a classification unit connected to the database to access the plurality of images. The classification unit may comprise a feature extraction module and an anatomical classification module. The classification unit may be configured to receive an image from the database, and identify at least one landmark point within the image. The classification unit may be further configured to select an image point in the image, and determine at least one feature for the image point relative to the landmark point.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Figure 1:
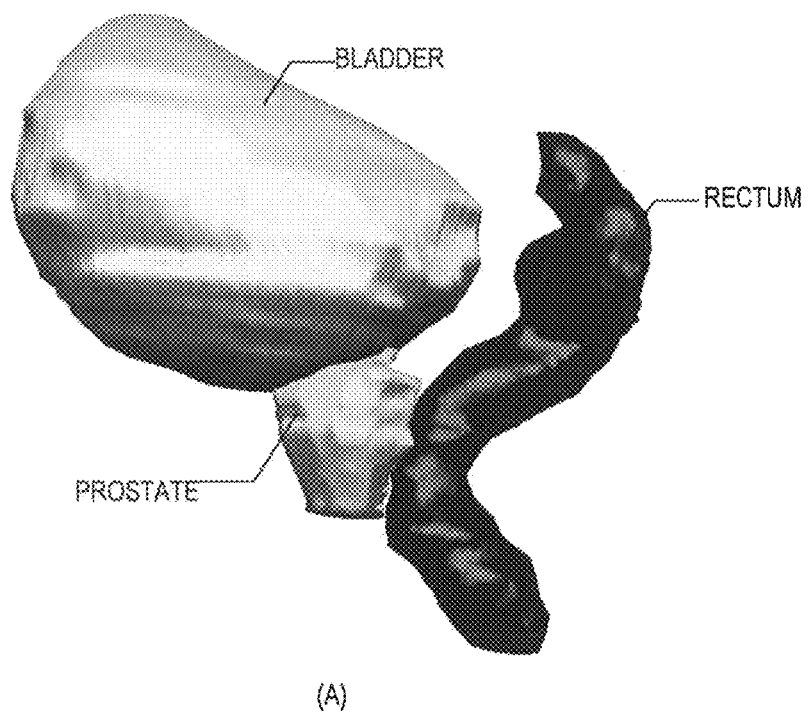
FIG. 1 illustrates an exemplary three-dimensional (3D) computer tomography (CT) image from a typical prostate cancer patient.
Figure 1:
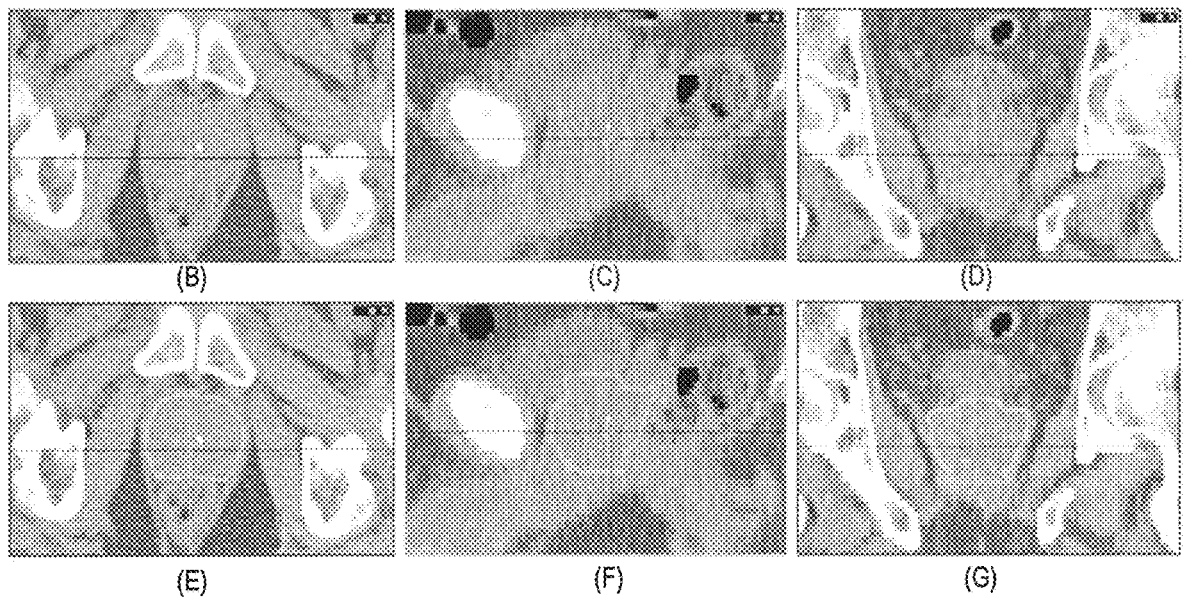

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be interpreted as open ended, such that an item or items following any one of these words is not meant to be an exhaustive listing of the item or items, or meant to be limited to only the listed item or items. And the singular forms "a," "an," and "the" are intended to include plural references, unless the context clearly dictates otherwise.

Systems and methods consistent with the present disclosure are directed to segmenting a medical image using learning algorithms based on landmark features. As used herein, a "learning algorithm" refers to any algorithm that can learn a model or a pattern based on existing information or knowledge. For example, the learning algorithm may be a machine learning algorithm or any other suitable learning algorithm. In some embodiments, a supervised learning algorithm, such as a Support Vector Machine (SVM), Adaboost/Logitboost, Random Forest, and neural network, may be used. In some other embodiments, semi-supervised learning algorithms may also be used.

Supervised learning is a branch of machine learning that infers a predication model given a set of training data. Each individual sample of the training data is a pair containing a data vector (such as a series of measurements) and a desired output value. A supervised learning algorithm analyzes the training data and produces a predictor function. The predictor function is called a classifier or a classification model when the output is discrete, such as a list of labels identifying different groups. The predictor function, once derived through training, is capable of predicting the correct output value for any valid input object.

Consistent with the disclosed embodiments, image segmentation may be formulated as a learning-based classification function, which classifies each image point of the medical image into one of the anatomical structures. As used herein, an "image point" refers to an image element in a digital image that corresponds to a physical point in the underlying object. For example, the image point is a pixel in a 2D image or a voxel in a 3D image.

Consistent with the disclosed embodiments, the image segmentation may also classify image blocks rather than image points. As used herein, an "image block" is a group of image points to be classified together. For example, the image block may be a super-pixel in a 2D image, or a super-voxel in a 3D image. When image points within an image block are known to belong to the same anatomical structure, classifying based on image blocks may be more efficient and accurate. Accordingly, whenever the term "image point" is used throughout this disclosure, it intends to cover both the basic "image point" and also the "image block" as defined above.

The disclosed segmentation methods generally include two stages: a training stage that "trains" or "learns" an anatomical classification model, and a classification stage that uses the anatomical classification model to predict the anatomical structure that each image point belongs to.

Consistent with the disclosed embodiments, the training process uses a set of training images to learn the anatomical classification model. As used herein, a "training image" is an image where the image points are already classified and labeled. For example, a training image may be previously segmented. Therefore, image points in the training image are associated with known anatomical structures.

Consistent with the disclosed embodiments, the training process identifies landmark points on each training image, and determines landmark features of each image point in the training image based on these landmark points. As used herein, a "landmark point" is a reference point in the training image that corresponds to a known anatomical landmark. Accordingly, a "landmark feature" is a feature associated with an image point and reflects a relationship between the image point and a landmark point. In some embodiments, the landmark feature may be indicative of the relative positions or geometries between the image point and the landmark point. Examples of the landmark features may include, but not limited to, (1) relative distance between the image point and the landmark point, (2) direction and/or component values of the displacement vector formed based on the image point with the landmark point, (3) angle, area, volume, or other geometric measures that can be computed from the shape formed by the image point and multiple landmark points, (4) relative intensity values between the image point and each landmark point, (5) any derived values based on above measures, such as sine/cosine of the angles or square or square root of the distance values.

Consistent with the disclosed embodiments, the training process uses the landmark features of each image point as the training data vector, and the known anatomical label of the corresponding image point as the desired output, and applies the supervised learning algorithm. Once properly trained using the process discussed in more detail below, such an algorithm can be used as part of an anatomical classifier.

Consistent with the disclosed embodiments, the classification module uses the trained classifier to make predictions regarding anatomical structures of image points in a medical image that has not been segmented. In the machine learning context, the classification is only a prediction of which anatomical structure the image point most likely belongs to. In other words, the classification module determines the probabilities that a particular image point belongs to each anatomical structure, and then predicts that the image point should belong to the anatomical structure associated with the highest probability.

Consistent with the disclosed embodiments, the classification module also identifies landmark points on the medical image to be segmented, and determines landmark features of each image point in the image based on these landmark points. The landmark points are generally at the same locations as those identified on the training images. Similarly, the landmark features determined are also generally of the same types as those determined during the training process. The landmark features are then provided to the trained classifier to yield predictions of an anatomical structure label for each image point. Once all the image points in the medical image are properly labeled, the image has been segmented.

Consistent with the disclosed embodiments, the training module and the classification module may also determine and use image features that are not landmark-based. As used herein, an "image feature" is associated with an image point and reflects local properties or context characteristics of the associated image point. Examples of an image feature may include, but not limited to, image intensity, image texture, image patch, curvature of an intensity profile, etc. The disclosed training module and the classification module may use one or more image features in conjunction with landmark features.

The disclosed image segmentation systems and methods can be applied to medical images obtained from any type of imaging modalities, including, but not limited to X-ray, CT, CBCT, spiral CT, magnetic resonance imaging (MRI), ultrasound (US), positron emission tomography (PET), single-photon emission computed tomography (SPECT), and optical images. Furthermore, the disclosed image segmentation systems and methods can be adapted to segment both 2D and 3D images. When segmenting a 2D image, the landmark points are identified in a 2D plane, and the related landmark features are also computed in 2D.

Exemplary embodiments are now described with reference to the accompanying drawings. In the figures, the left-most digit(s) of a reference number identifies the figure in which the reference number first appears. Wherever convenient, the same reference numbers are used throughout the drawings to refer to the same or like parts.

Figure 2:
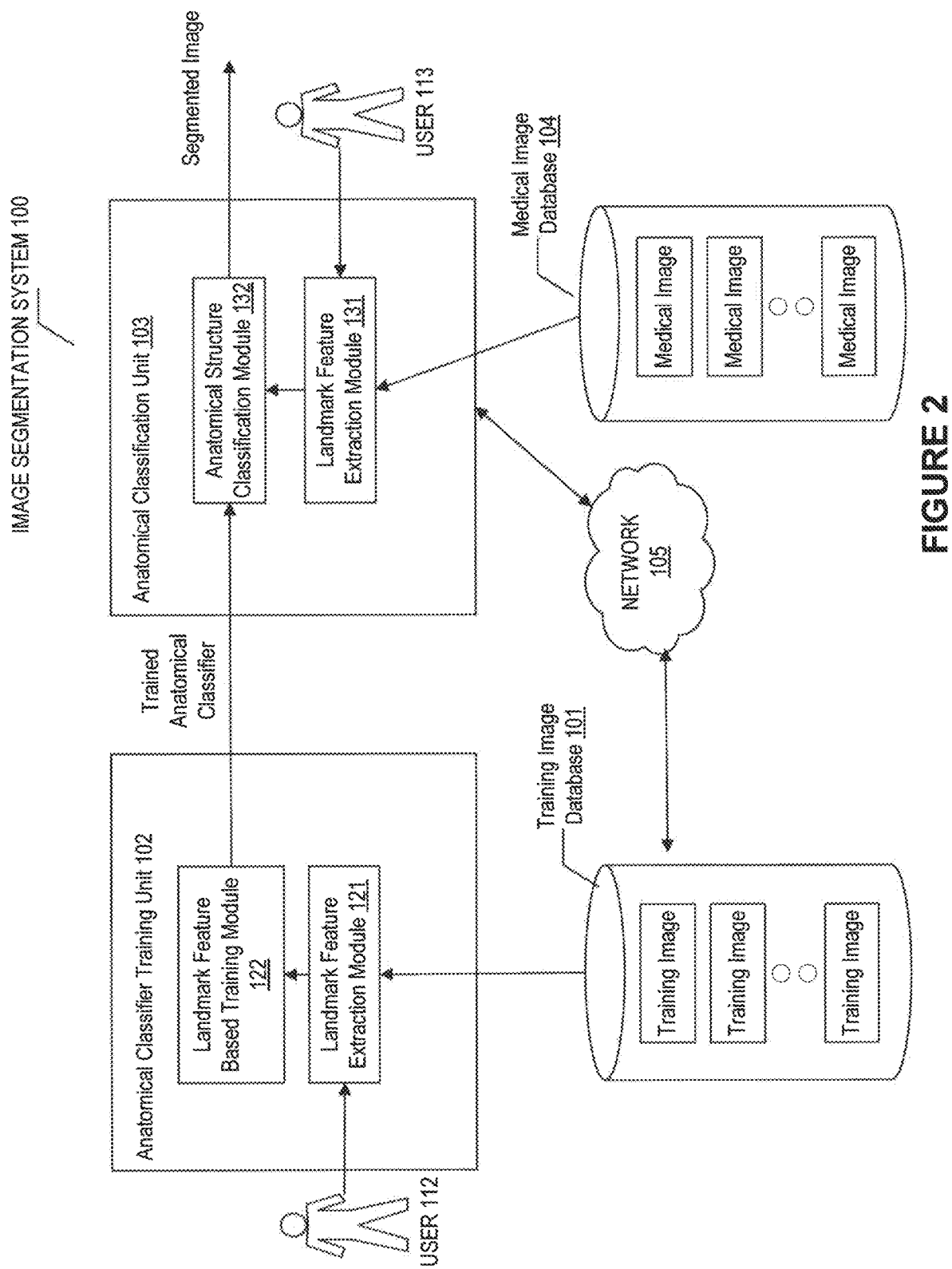
FIG. 2 illustrates an exemplary image segmentation system for segmenting medical images based on learning algorithms using landmark features, according to some embodiments of the present disclosure.

FIG. 1 has been previously introduced. FIG. 2 illustrates an exemplary image segmentation system 100 for segmenting medical images based on learning algorithms using landmark features, according to some embodiments of the present disclosure. Image segmentation system 100 may include a training image database 101, an anatomical classifier training unit 102, an anatomical classification unit 103, a medical image database 104, and a network 105. In some embodiments, image segmentation system 100 may include more or less of the components shown in FIG. 2. For example, when an anatomical classifier is pre-trained and provided, image segmentation system 100 may only include anatomical classification unit 103, medical image database 104, and, optionally, network 105.

In some embodiments, the various components of image segmentation system 100 may locate remotely from each other, and be connected through network 105. In some alternative embodiments, certain components of image segmentation system 100 may be located on the same site or inside one device. For example, training image database 101 may be located on site with anatomical classifier training unit 102, or be part of anatomical classifier training unit 102. As another example, anatomical classifier training unit 102 and anatomical classification unit 103 may be inside the same computer or processing device.

As shown in FIG. 2, anatomical classifier training unit 102 may communicate with training image database 101 to receive one or more training images. The training images stored in training image database 102 may be obtained from a medical image database, which contain images of previous radiotherapy treatment sessions. The training images are pre-segmented. That is, each image point (pixel or voxel) in the training image is associated with either the background or one of the known anatomical structures contained in the training image. Consistent with the disclosed embodiments, the training images may include MRI images, 3D MRI, 2D streaming MRI, 4D volumetric MRI, CT images, CBCT images, Spiral CT images, PET images, functional MRI images (e.g., fMRI, DCE-MRI and diffusion MRI), X-ray images, fluoroscopic images, ultrasound images, radiotherapy portal images, SPECT images, and the like. In some embodiments, the training data may be collected from an Oncology Information System.

Anatomical classifier training unit 102 may use the training images received from training image database 102 to generate an anatomical classifier using learning algorithms. As shown in FIG. 2, anatomical classifier training unit 102 may include a landmark feature extraction module 121 and a landmark feature based training module 122. Anatomical classifier training unit 102 may additional include input and output interfaces (not shown) to communicate with training image database 101, network 105, and user 112. Consistent with some embodiments, anatomical classifier training unit 102 may be implemented with hardware (e.g., as disclosed in FIG. 3) specially programmed by software that performs an anatomical classifier training process (e.g., as disclosed in FIGS. 4A and 4B).

Landmark feature extraction module 121 may identify one or more landmark points on each training image received. In some embodiments, landmark points may be detected automatically by landmark feature extraction module 102, e.g., based on the image segmentation and prior knowledge about the various anatomical structures. In some alternative embodiments, landmark points may be selected or identified by user 112. For example, user 112 may click on the training image displayed by an image display (not shown) to input the location of the landmark points or user may 112 may select a predetermined pattern, map, or configuration of landmark points. Consistent with the disclosed embodiments, the landmark points may be anatomical landmarks of various anatomical structures.

Landmark feature extraction module 121 may further select an image point distinct from the landmark points. The image point can be randomly selected within the training image. That is, the image point selected can be anywhere in the training image—e.g., in any of the same anatomical structures as the landmark points or in a different anatomical structure. Landmark feature extraction module 102 may then determine and derive, for each selected image point, one or more landmark features based on the relationship between the selected image point and each of the landmark points. This feature extraction process may repeat for a set of selected image points in a training image until all image points in the training image have been selected and processed. By explicitly defining a consist set of anatomical landmark points that serve as references, each image point is now encoded with high level location and geometry information. Once landmark features are determined for all the relevant image points in the training image, the landmark features are provided to landmark feature based training module 122.

Landmark feature based training module 122 may use the selected image points as training data, to train the classifier. In some embodiments, the training may be based on learning algorithms, such as supervised machine learning algorithms. For example, learning algorithms such as Support Vector Machine (SVM), Adaboost/Logitboost, Random Forests, and Neural Networks may be used. The classifier is trained such that when the landmark features for a particular image point in the training image is input to the model, the model outputs a prediction of the anatomical structure that matches the predetermined anatomical structure of the image point. After being trained using numerous image points from numerous training images, the classifier becomes intelligent enough to predict the anatomical structure of a unclassified image point in any new image.

Anatomical classification unit 103 may receive the trained anatomical classifier from anatomical classifier training unit 102. As shown in FIG. 2, anatomical classification unit 103 may include a landmark feature extraction module 131 and an anatomical structure classification module 132. Anatomical classification unit 103 may additionally include input and output interfaces (not shown) to communicate with training image database 104, network 105 and user 113. Consistent with some embodiments, anatomical classification unit 103 may be implemented with hardware (e.g., as disclosed in FIG. 3) specially programmed by software that performs an anatomical classifier training process (e.g., as disclosed in FIGS. 5A and 5B).

Anatomical classification unit 103 may communicate with medical image database 104 to receive one or more medical images. The medical images stored in medical image database 103 may be obtained from a medical image database, which contains images of radiotherapy treatment sessions. These medical images are typically not segmented yet. Consistent with the disclosed embodiments, the medical images may be acquired using various imaging modalities, include MRI, functional MRI, CT, CBCT, Spiral CT, PET, SPECT, X-ray, fluoroscopic imaging, ultrasound, and radiotherapy portal imaging, etc. In some embodiments, medical image database 104 may be an integrated part of anatomical classification unit 103, or located on the same site of anatomical classification unit 103, such as in a radiotherapy treatment room.

Landmark feature extraction module 131 may have similar hardware and software structures as landmark feature extraction module 121. Landmark feature extraction module 131 may identify one or more landmark points on each medical image received from medical image database 105. The landmark points identified on the medical images are consistent with those identified on the training images. Again, the landmark points may be selected by user 113, or automatically identified by landmark feature extraction module 131.

Landmark feature extraction module 131 may further select an image point distinct from the landmark points in the medical image, and determine one or more landmark features based on the relationship between the selected image point and the landmark points. The feature extraction process may repeat for a set of selected image points in the medical image until all image points in the medical image have been selected and processed. The determined landmark features may be provided to anatomical structure classification module 132.

Anatomical structure classification module 132 may use the trained anatomical classifier received from anatomical classifier training unit 102, and the landmark features received from landmark feature extraction module 132, to predict the anatomical structures for the respective image points. When all the selected image points are classified, anatomical structure classification module 132 may output the segmented image. In some embodiments, the segmented image may be displayed to user 113, or stored in medical image database 104 for further treatment usage. In some embodiments, the segmented image may be automatically stored in training image database 101 and become a training image.

Network 105 may provide connections between any of the above described components in image segmentation system 100. For example, network 105 may be a local area network (LAN), a wireless network, a cloud computing environment (e.g., software as a service, platform as a service, infrastructure as a service), a client-server, a wide area network (WAN), and the like.

Figure 3:
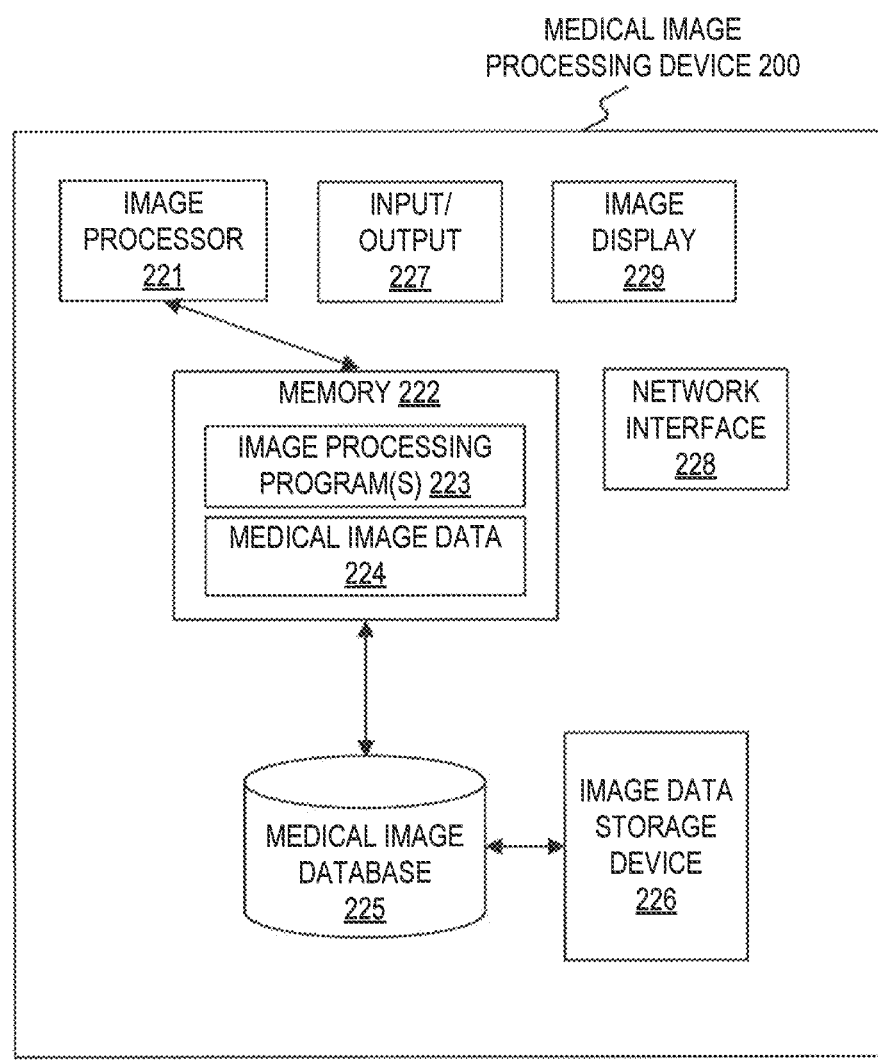
FIG. 3 illustrates an exemplary medical image processing device, according to some embodiments of the present disclosure.

FIG. 3 illustrates an exemplary medical image processing device 200, according to some embodiments of the present disclosure. Medical image processing device 200 may be an embodiment of anatomical classifier training unit 102, or anatomical classification unit 103, or the combination of the two. As would be appreciated by those skilled in the art, in some embodiments, medical image processing device 200 may be a special-purpose computer, or a general-purpose computer. For example, medical image processing device 200 may be a computer custom built for hospitals to handle image acquisition and image processing tasks.

As shown in FIG. 3, medical image processing device 110 may include an image processor 221, a memory 222, a medical image database 225, an image data storage device 226, an input/output 227, a network interface 228, and an image display 229.

Image processor 221 may be a processing device, include one or more general-purpose processing devices such as a microprocessor, central processing unit (CPU), graphics processing unit (GPU), or the like. More particularly, image processor 221 may be a complex instruction set computing (CISC) microprocessor, reduced instruction set computing (RISC) microprocessor, very long instruction Word (VLIW) microprocessor, a processor implementing other instruction sets, or processors implementing a combination of instruction sets. Image processor 221 may also be one or more special-purpose processing devices such as an application specific integrated circuit (ASIC), a field programmable gate array (FPGA), a digital signal processor (DSP), a System on a Chip (SoC), or the like.

Image processor 221 may be communicatively coupled to memory 222 and configured to execute the computer executable instructions stored thereon. Memory 222 may include a read-only memory (ROM), a flash memory, a random access memory (RAM), a static memory, etc. In some embodiments, memory 222 may store computer executable instructions, such as one or more image processing programs 223, as well as data used or generated while executing the computer programs, such as medical image data 224. Processor 221 may execute Image processing programs 223 to implement functionalities of anatomical classifier training unit 102 and/or anatomical classification unit 103. Processor 221 may also send/receive medical image data 224 from memory 222. For example, processor 221 may receive training image data or medical image data stored in memory 222. Processor 221 may also generate intermediate data such as landmark points and landmark features, and send them to memory 222.

Medical image processing device 200 may optionally include a medical image database 225, which include one or both of training image database 101 and medical image database 104. One skilled in the art would appreciate that medical image database 225 may include a plurality of devices located either in a central or distributed manner. Processor 221 may communicate with medical mage database 225 to read images into memory 222 or store segmented images from memory 222 to medical image data 225.

Image data storage device 226 may be an additional storage available to store data associated with image processing tasks performed by image processor 221. In some embodiments, image data storage device 226 may include a machine-readable storage medium. While the machine-readable storage medium in an embodiment may be a single medium, the term "machine-readable storage medium" should be taken to include a single medium or multiple media (e.g., a centralized or distributed database, and/or associated caches and servers) that store the one or more sets of computer executable instructions or data. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical and magnetic media.

Input/output 227 may be configured to allow data to be received and/or transmitted by medical image processing device 200. Input/output 227 may include one or more digital and/or analog communication devices that allow medical image processing device 200 to communicate with user or other machines and devices. For example, input/output 227 may include a keyboard and a mouse for user 112 or user 113 to provide input.

Network interface 228 may include a network adaptor, a cable connector, a serial connector, a USB connector, a parallel connector, a high-speed data transmission adaptor such as fiber, USB 3.0, thunderbolt, and the like, a wireless network adaptor such as a WiFi adaptor, a telecommunication (3G, 4G/LTE and the like) adaptor, and the like. Medical image processing device 200 may be connected to network 105 through network interface 228. Image display 229 may be any display device that suitable for displaying the medical images. For example, image display 229 may be an LCD, CRT, or LED display.

Figure 4A:
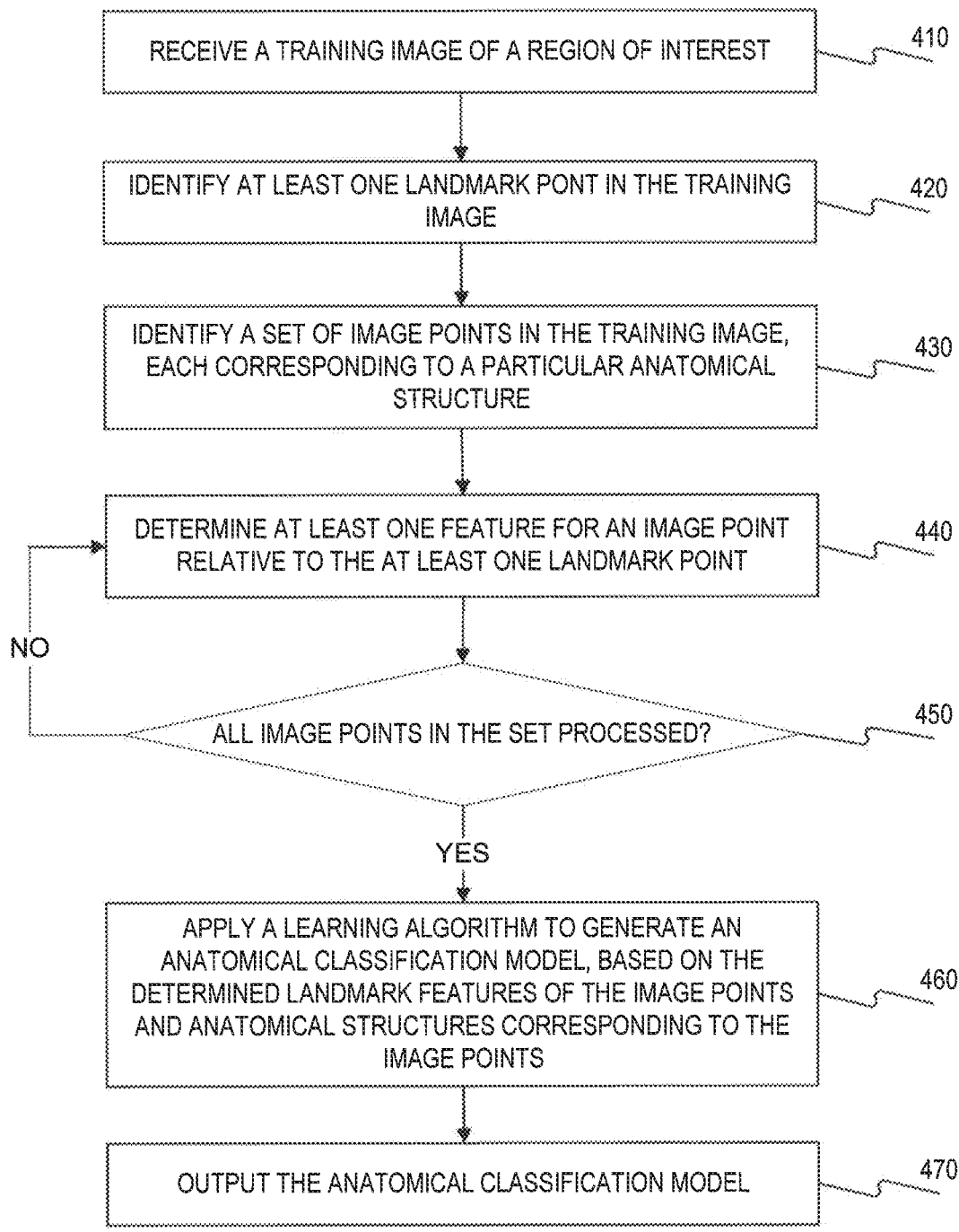
FIG. 4A is a flowchart illustrating an exemplary anatomical classifier training process for training an anatomical classification model using landmark features extracted from training images, according to some embodiments of the present disclosure.

FIG. 4A is a flowchart illustrating an exemplary anatomical classifier training process 400A for training an anatomical classification model using landmark features extracted from training images, according to some embodiments of the present disclosure. In some embodiments, anatomical classifier training process 400A may be performed by anatomical classifier training unit 102.

Process 400A may start when anatomical classifier training unit 102 receives a training image of a region of interest from training image database 101 (Step 410). For example, the training image may show the pelvic area, the head area, the cardiac area, the liver area, or another anatomical area of a patient. In some embodiments, the training image may be of a same or similar region of interest as the medical image to be segmented.

In Step 420, landmark feature extraction module 121 may identify at least one landmark point in the training image. Because, in example embodiments, landmark feature extraction module 121 will define or locate the same set of landmark points across all the training images, it may thus be preferred that the selected landmark points have strong or distinct image characteristics. For example, the landmark points may correspond to unique or distinct anatomical locations of a human body or have distinct image appearance.

These landmark points can either be manually picked by user 112 and provided to landmark feature extraction module 121, or automatically detected by landmark feature extraction module 121. In some embodiments, automatic detection may be performed through, e.g., image registration between the training image and a predetermined landmark map of the same anatomical region. For example, a predetermined landmark map may define a particular mapping or spacing of various landmark points for a particular anatomical region. If user 112 is processing medical images showing a particular anatomical region of a patient, then user 112 could thus select a predetermined landmark map that corresponds to that anatomical region. Upon selection, the landmark points defined by the predetermined map may then be provided to module 121. When the training image is a 3D image, the landmark points may be voxels, and when the training image is a 2D image, the landmark points may be pixels.

Figure 6:
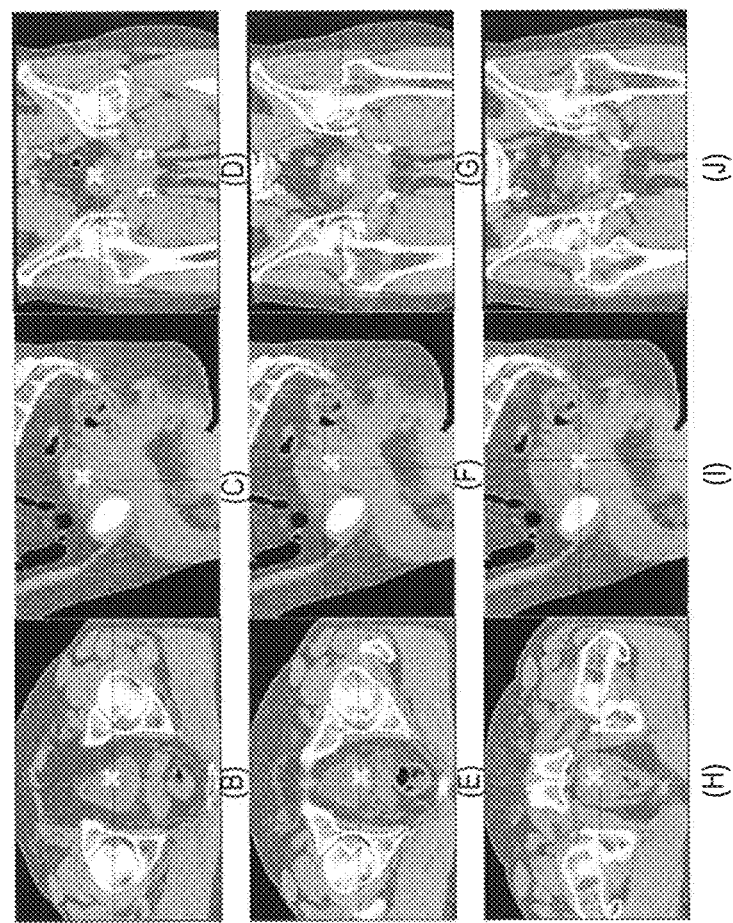
FIG. 6 illustrates exemplary landmark points in various different anatomical structures of a 3D medical image and its corresponding axial, sagittal and coronal views, according to some embodiments of the present disclosure.
Figure 6:
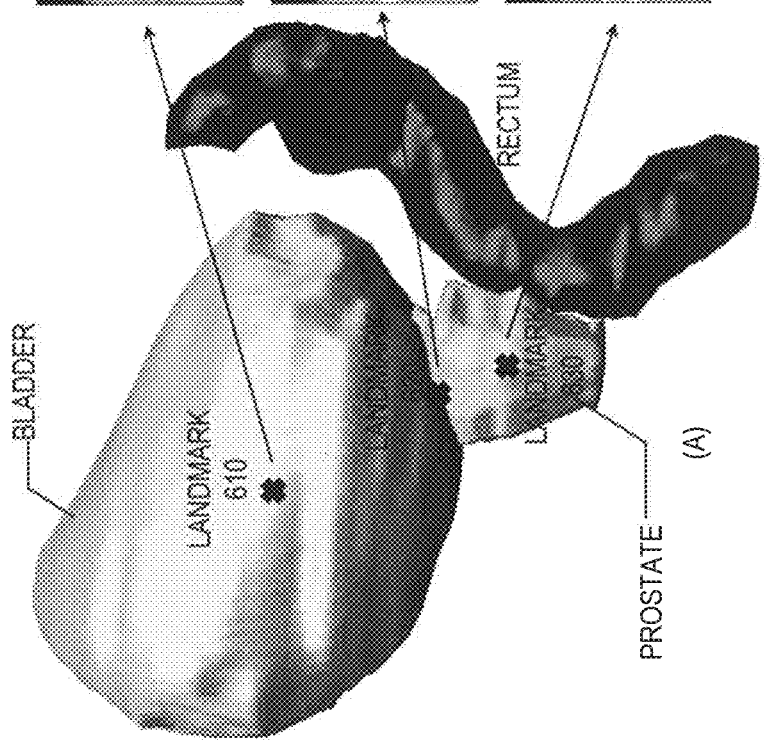

For example, FIG. 6 illustrates exemplary landmark points 610-630 in various different anatomical structures of a 3D medical image (A) and its corresponding axial, sagittal and coronal views (B)-(J), according to some embodiments of the present disclosure. As shown in FIG. 6, landmark point 610 is located near the center of the bladder, landmark point 620 is located on the border of the bladder and the prostate, and landmark point 630 is located near the center of the prostate. Images (B), (C), and (D) are axial, sagittal and coronal views that show landmark point 610. Images (E), (F), and (G) are axial, sagittal and coronal views that show landmark point 620. Images (H), (I), and (J) are axial, sagittal and coronal views that show landmark point 630.

A person skilled in the art would appreciate that landmark points are not limited to the exemplary locations shown in FIG. 6, but rather, can be selected at any locations of the training image. Also, the landmark points are not limited to the pelvic region. They can be located in any region of the human body, such as head and neck, lung, liver or female pelvis.

Returning to FIG. 4A, in Step 430, landmark feature extraction module 121 may identify a set of image points in the training image, where each image point is pre-associated with a known anatomical structure. The image points so identified may include representative image points in the background and each of the anatomical structures present in the training image.

In step 440, landmark feature extraction module 121 may determine at least one landmark feature for an image point relative to the at least one landmark point. In some embodiments, the landmark features can be computed for each image point based on its relative position and geometry with respect to the landmark points. As a result, a set of landmark features may be determined for a particular image point relative to a single landmark point. When multiple landmark points are identified in Step 420, multiple sets of landmark features may be associated with a particular image point.

Figure 7:
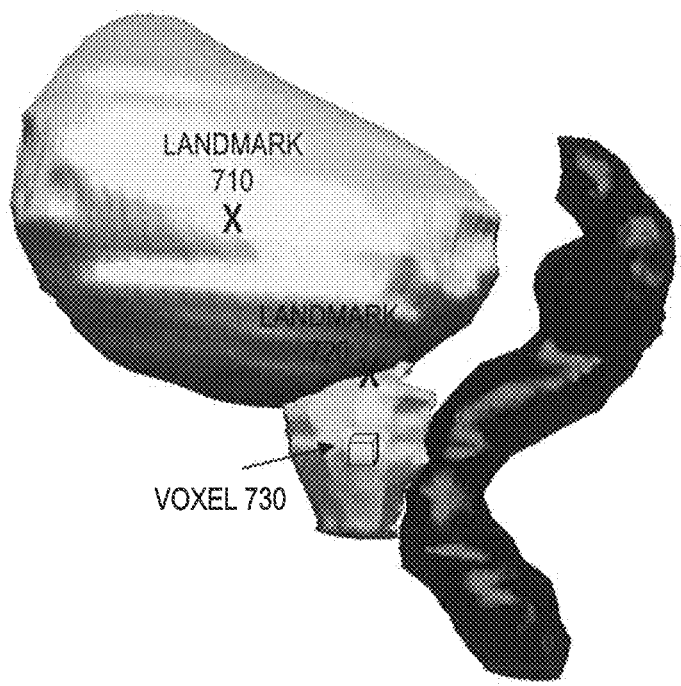
FIG. 7 illustrates landmark features for an image voxel relative to two landmark points, according to some embodiments of the present disclosure.
Figure 7:
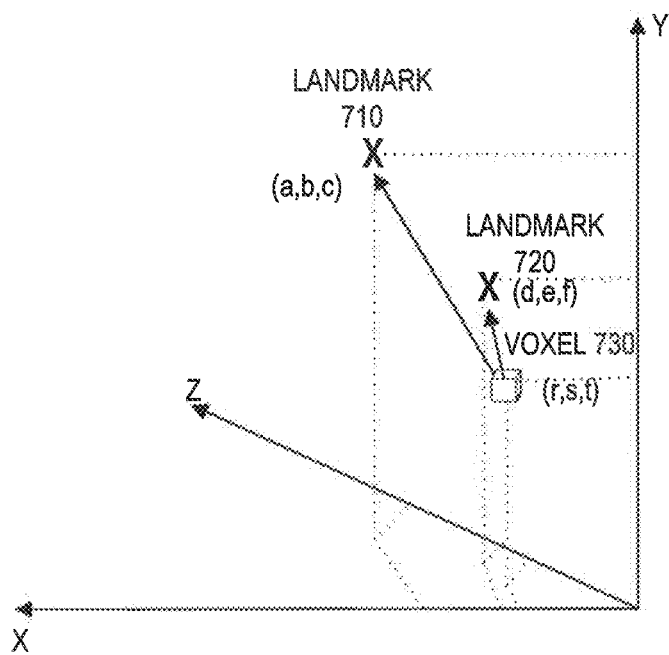

For example, FIG. 7 illustrates landmark features for an image voxel 730 relative to two landmark points 710 and 720, according to some embodiments of the present disclosure. As shown in FIG. 7, landmark point 710 is located near the center of the bladder and landmark point 720 is located on the border of the bladder and the prostate. Image voxel 730 is located in the prostate area.

FIG. 7 further shows landmark points 710, 720 and image voxel 730 in a 3D Cartesian coordinate. The coordinates for landmark point 710 are (a, b, c), for landmark point 720 are (d, e, f), and for image voxel 730 are (r, s, t). In this illustration, the landmark features of image voxel 730 are based on a positional or geometrical relationship between image voxel 730 and each of landmark points 710 and 720.

In some embodiments, the landmark features may include relative distance between the image point and the landmark point. For example, the relative distance between image point 730 and landmark point 710 is $\sqrt[2]{(a-r)^2+(b-s)^2+(c-t)^2}$ and relative distance between image point 730 and landmark point 720 is $\sqrt[2]{(d-r)^2+(e-s)^2+(f-t)^2}$.

In some embodiments, the landmark features may also include direction and/or component values of the displacement vector formed between or by connecting the image point with the landmark point. For example, FIG. 7 shows arrows pointing from image voxel 730 to each of the two landmark points 710, 720, which indicate the respective directions of the displacement vectors between them. The component values of such vectors can also be calculated to form landmark features associated with image voxel 730.

In some embodiments, the landmark features may include angle, area, volume, or other geometric measures that can be computed from the shape formed by the image point and multiple landmark points. For example, landmark points 710, 720, and image voxel 730 form a triangle, where the three angles and the area of the triangle can be calculated to define landmark features associated with image voxel 730.

In some further embodiments, the landmark features also include relative intensity values between the image point and each landmark point. In addition, landmark feature extraction module 121 may further derive any values based on one or more of the above measures, such as sine/cosine of the angles or square or square root of the distance values, and use these derivative values as landmark features associated with image voxel 730.

Returning to FIG. 4A, Step 440 will be performed for all the image points in the set identified in step 430. In Step 450, landmark feature extraction module 121 may determine if all the image points in the set have been processed, and if so (Step 450: Yes), proceed to Step 460. Otherwise (Step 460: No), Step 440 will be repeated to process the next image point.

In Step 460, landmark feature based training module 122 may apply a learning algorithm to generate an anatomical classification model, based on the landmark features determined in Step 440 and the anatomical structures pre-assigned to these image points. In some embodiments, landmark feature extraction module 121 may apply a support vector machine (SVM) to train the classification model. An SVM training algorithm builds a model that assigns an input into one of multiple categories. An SVM model is a representation of the samples as points in space, mapped such that the samples of the separate categories are divided into separate groups in space. That is, an SVM model may map the landmark features into high-dimensional spaces corresponding to the various anatomical structures. The training data help refine the mapping, so that once trained, the SVM model can map new inputs (landmark features of an unclassified image point) into the same spaces and predict which anatomical structure the image point belongs to.

In Step 470, the trained anatomical classification model may be output by anatomical classifier training unit 102, and be provided to anatomical classification unit 103. Process 400A may conclude after Step 470.

Figure 4B:
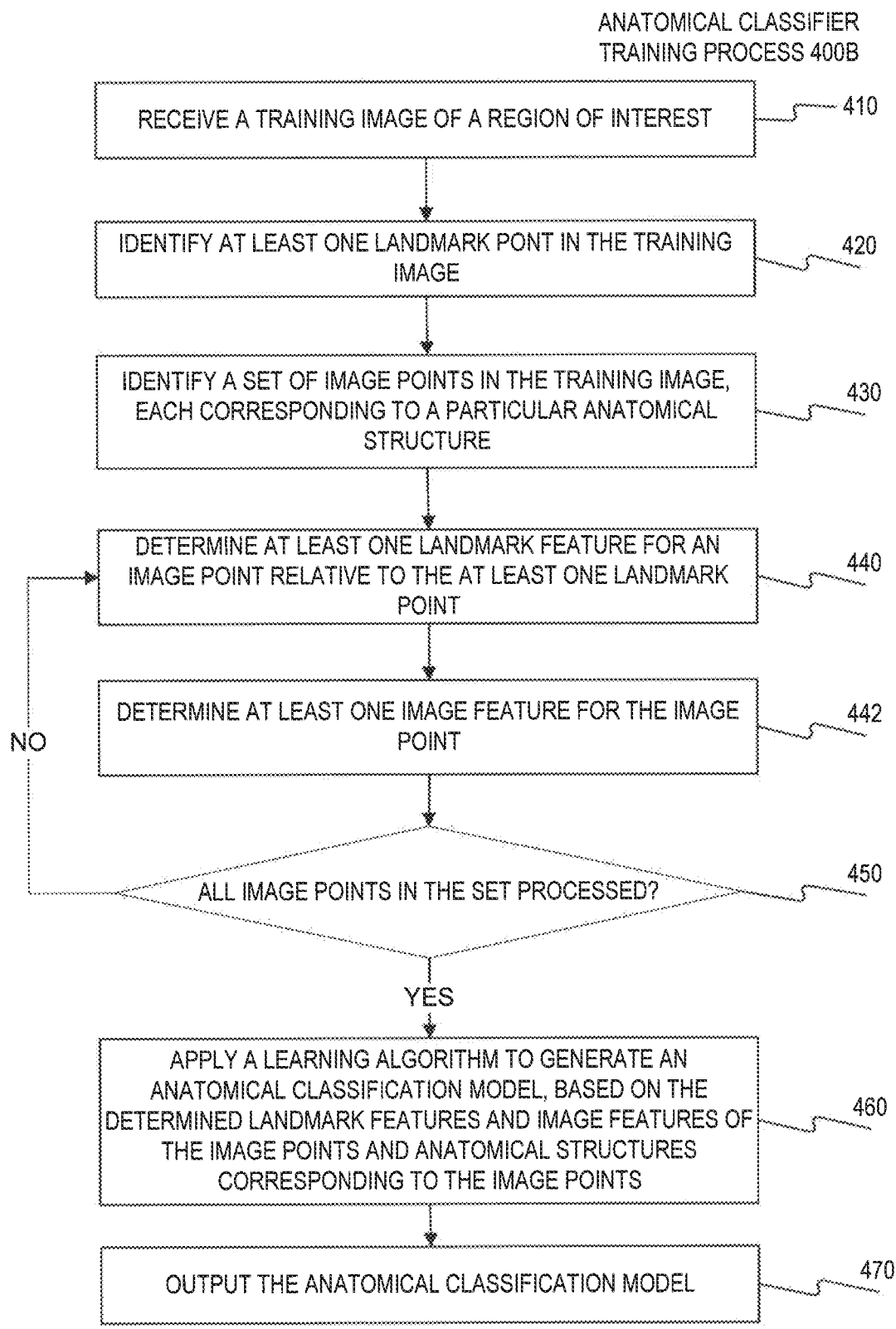
FIG. 4B is a flowchart illustrating another exemplary anatomical classifier training process exemplary process for training an anatomical classification model using landmark features extracted from training images, according to some embodiments of the present disclosure.

FIG. 4B is a flowchart illustrating another exemplary anatomical classifier training process 400B for training an anatomical classification model using landmark features extracted from training images, according to some embodiments of the present disclosure. Anatomical classifier training process 400B is similar to process 400A, except for the additional Step 442 and the modified Step 460. Accordingly, Steps 410-440, 450, and 470 will not be described again.

In addition to the landmark features determined in Step 440, in Step 442, landmark feature extraction module 121 may further determine at least one image feature for the image point. As noted above, an image feature may reflect a local property or context characteristic of the image point. In some embodiments, image features may include, but not limited to, image intensity, image texture, one or more image patches, curvatures of intensity profile, and any combination or derivative of the above. In Step 460, landmark feature based training module 122 may use both the landmark features and the image features to train the anatomical classification model. The combination of landmark features and image features may improve the accuracy of image segmentation.

Figure 5A:
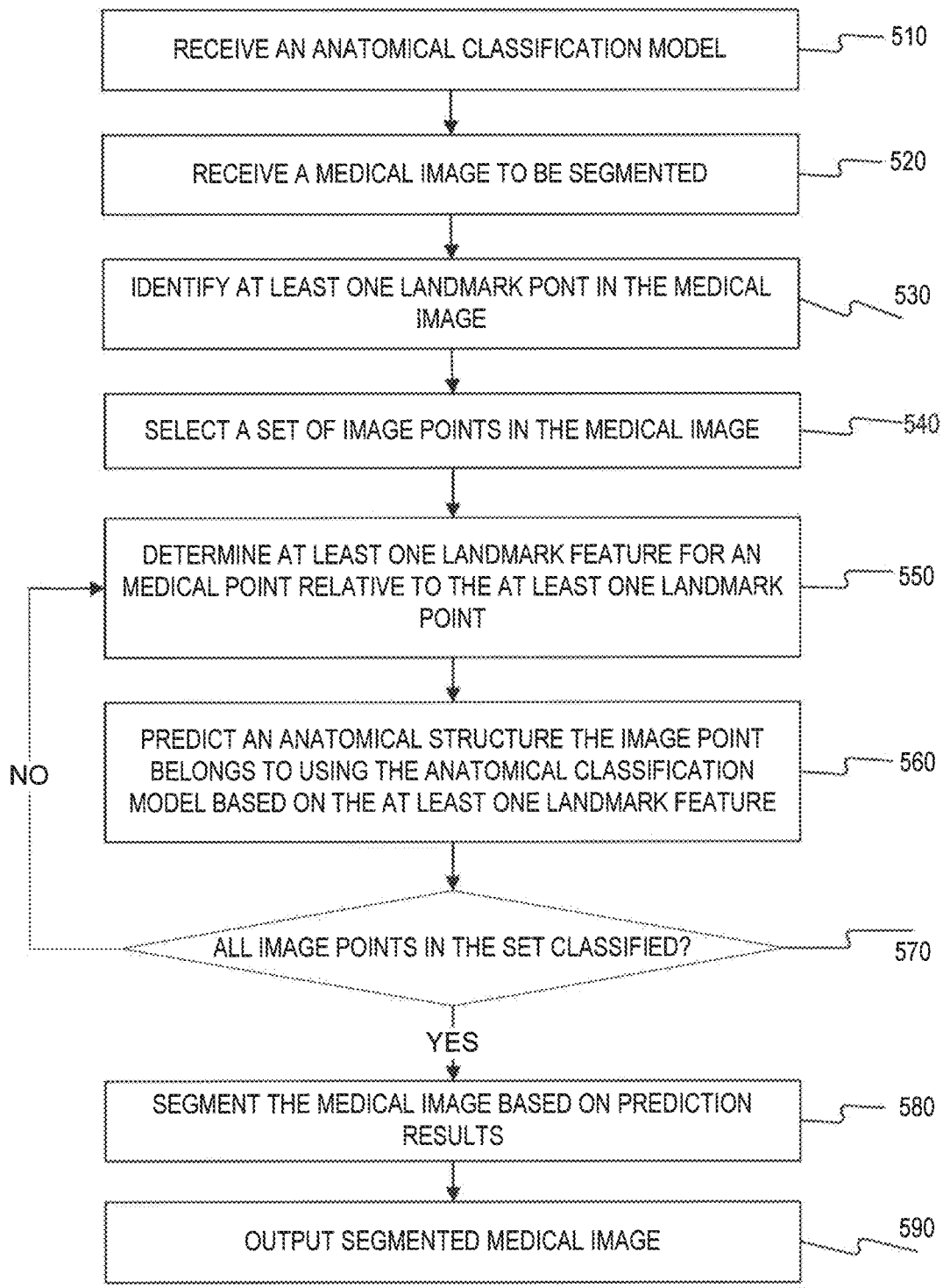
FIG. 5A is a flowchart illustrating an exemplary anatomical classification process for classifying image points within a medical image using the anatomical classification model obtained through the process of FIG. 4A, according to some embodiments of the present disclosure.

FIG. 5A is a flowchart illustrating an exemplary anatomical classification process 500A for classifying image points within a medical image using the anatomical classification model obtained through the process of FIG. 4A, according to some embodiments of the present disclosure.

Anatomical classification process 500A may start when anatomical classification unit 103 receives an anatomical classification model, e.g., from anatomical classifier training unit 102 (Step 510). In Step 520, anatomical classification unit 103 further receives a medical image from medical image database 104. In Step 530, landmark feature extraction module 131 may identify at least one landmark point in the medical image, similar to what is performed in Step 420 of FIGS. 4A and 4B. In Step 530, these landmark points are preferably identified by landmark feature extraction module 121, but can also be manually identified or determined by user 112. The landmark points identified in the medical image are generally the same as those identified in the training image during processes 400A and 400B.

In Step 540, landmark feature extraction module 131 may select a set of image points in the medical image. In some embodiments, these image points may be those not already associated with any anatomical structure. It is not necessary to select the same set of image points that are selected in Steps 430 of processes 400A and 400B.

In Step 550, landmark feature extraction module 131 may determine, for the image point selected in Step 540, at least one landmark feature for the selected image point relative to the at least one landmark point. Step 550 may be performed similarly to Steps 440 of processes 400 A and 400B. The types of landmark features determined in Step 550 are generally the same as those determined in Steps 440 of processes 400A and 400B.

In Step 560, anatomical structure classification module 132 may use the anatomical classification model received from anatomical classifier training unit 102 to predict an anatomical structure associated with the image point. For example, the landmark features determined in Step 550 may be input into the anatomical classification model. The anatomical classification model then analyzes these landmark features based on its existing knowledge, i.e., the relationship between landmark features of a image point and the anatomical structure of that image point learned during the training. Finally, the anatomical classification model may assign the image point to one of the anatomical structures.

Steps 550 and 560 will be performed for all the image points in the set identified in step 540. For example, Steps 550 and 560 may be repeated until all image points in the medical image have been processed and classified. In step 570, anatomical structure classification module 132 may determine if all the image points in the set have been processed, and if so (Step 570: Yes), proceed to Step 580. Otherwise (Step 580: No), Steps 550 and 560 will be repeated to process the next image point.

In Step 580, anatomical structure classification module 132 may segment the medical image based on the prediction results. In some embodiments, anatomical structure classification module 132 may assign a constant value to the image points classified as having the same anatomical structure. In some embodiments, the image points are color-coded according to which anatomical structure they belong to. In some embodiments, as part of Step 580, anatomical structure classification module 132 may change the classification of certain image points during the segmentation. For example, changes may be applied to smooth the contour between two anatomical structures, or between the background and an anatomical structure. As another example, the anatomical structures are generally continuous. Therefore, it is unlikely that an image point surround by all prostate image points will be classified as part of a bladder. Accordingly, anatomical structure classification module 132 may change the classification result of an image point based on its neighboring image points.

In Step 590, the segmented medical image is output from anatomical classification unit 103. In some embodiments, the segmented medical image may be displayed to a user on image display 228. In some embodiments, the segmented medical image may be stored in medical image database for future medical usage. In some other embodiments, the segmented medical image may be stored in training image database 101 as a training image to enrich the knowledge base. Process 500A may conclude after Step 590.

Figure 5B:
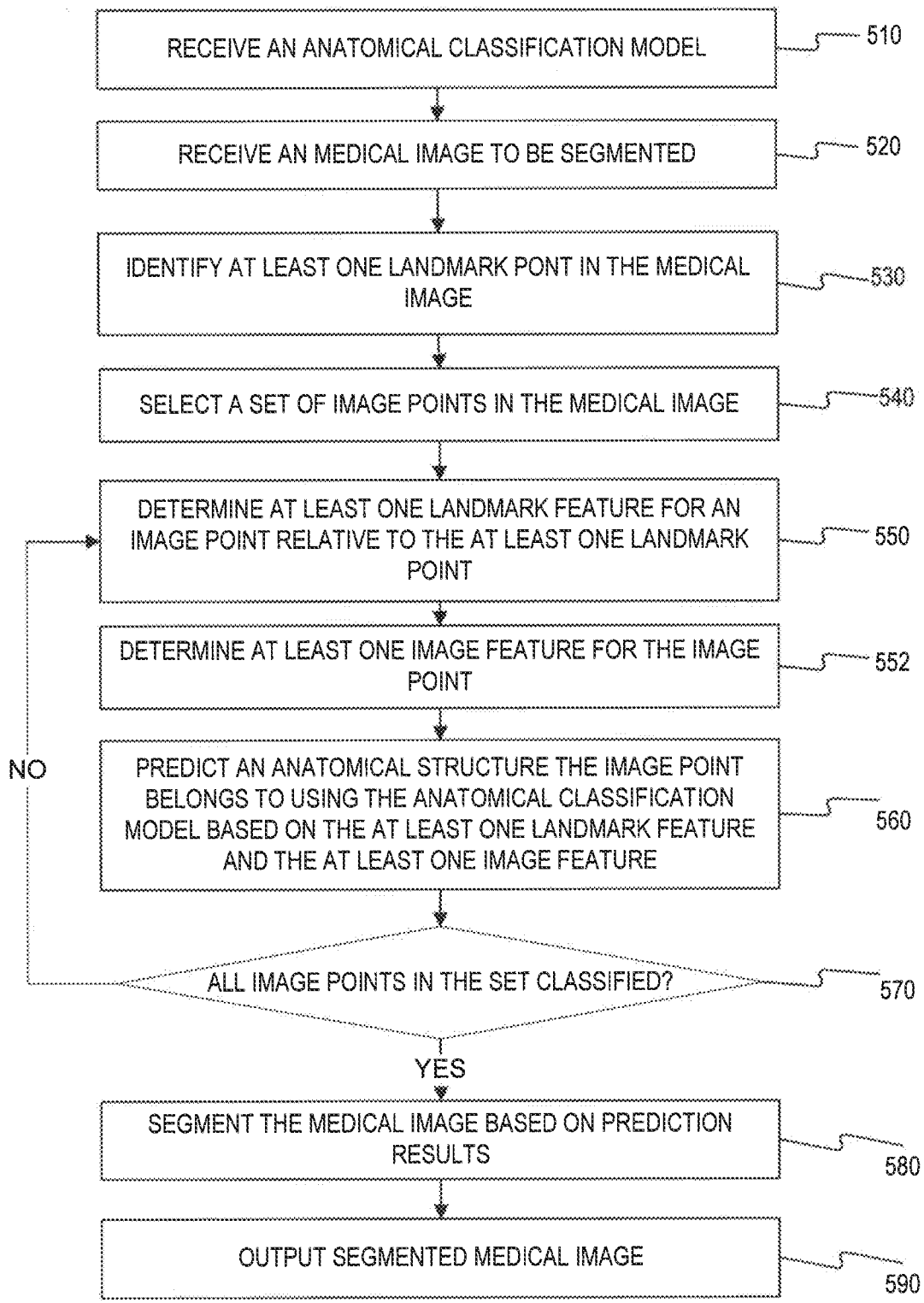
FIG. 5B is a flowchart illustrating another exemplary anatomical classification process for classifying image points within a medical image using the anatomical classification model obtained through the process of FIG. 4B, according to some embodiments of the present disclosure.

FIG. 5B is a flowchart illustrating another exemplary anatomical classification process 500B for classifying image points within a medical image using the anatomical classification model obtained through the process of FIG. 4B, according to some embodiments of the present disclosure. Anatomical classification process 500B is similar to process 500A, except for the additional Step 552 and the modified Step 560. Accordingly, Steps 510-550 and 570-590 will not be described again.

In addition to the landmark features determined in Step 550, in step 552, landmark feature extraction module 131 may further determine at least one image feature for the image point that based on local property or context characteristics of the image point. These Image features are generally the same types as those determined in Steps 442 of process 400B. In Step 560, anatomical classification unit 103 may use both the landmark features and the image features for the prediction. The combination of landmark features and image features may Improve the accuracy of the prediction and thus the quality of image segmentation.

Figure 8:
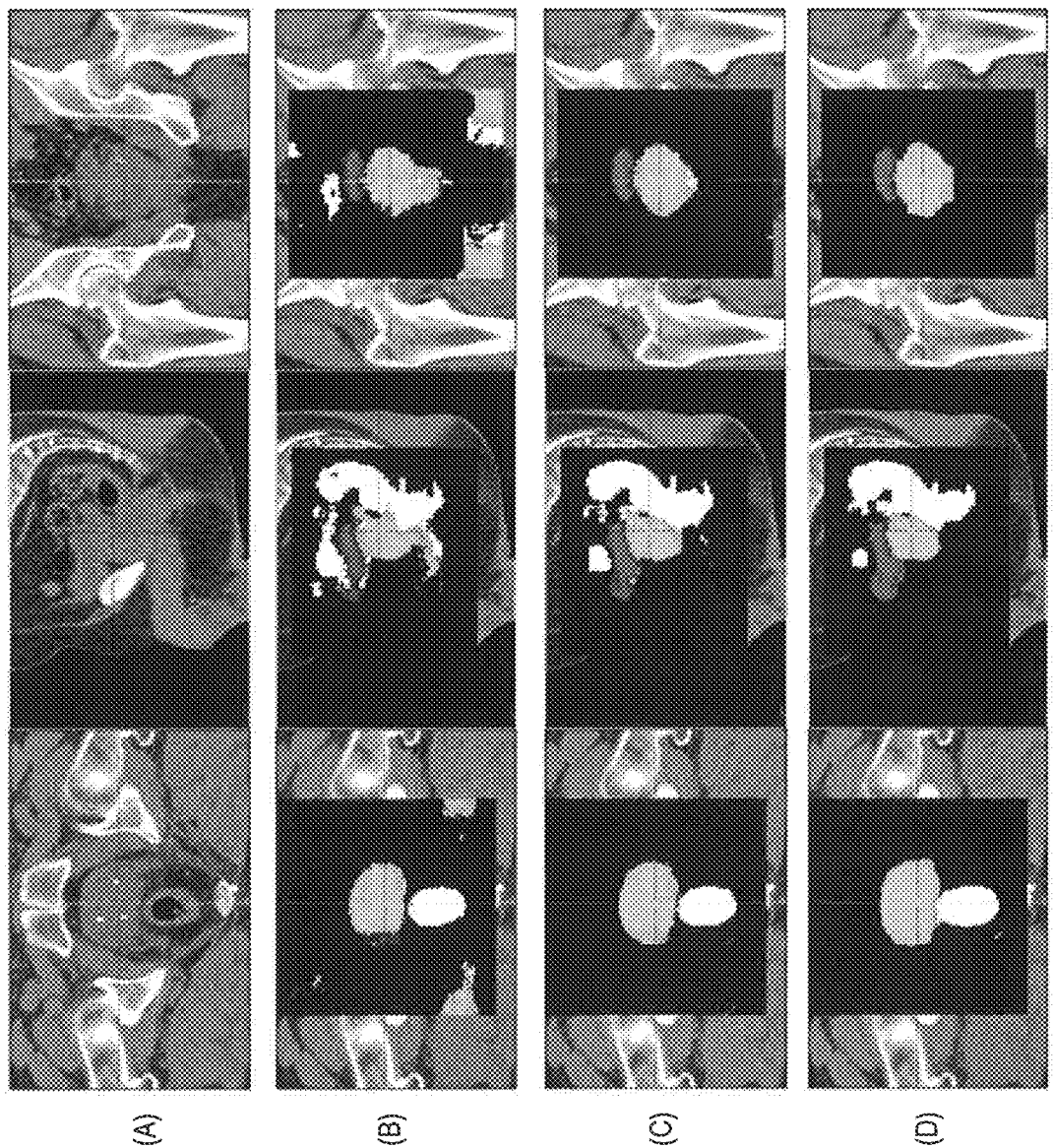
FIG. 8 illustrates segmentation results on the 3D CT image illustrated in FIG. 1, according to some embodiments of the present disclosure.

For example, FIG. 8 illustrates segmentation results on the 3D CT image illustrated in FIG. 1 using different sets of landmark features, according to some embodiments of the present disclosure. Rows (A)-(D) show the patient's 3D CT images in axial, sagittal and coronal views respectively. Specifically, Row (A) shows the medical images prior to segmentation. Row (B) shows the segmentation results of bladder, prostate and rectum by only using image features without any landmark feature. As shown, the segmentation results are noisy and have a relatively large mis-classification rate. For example, some prostate voxels are misclassified as rectum voxels, and some rectum voxels are misclassified as body voxels. Row (C) shows the segmentation results by using three landmark features in conjunction with the image features used for Row (B). The results are less noisy and the mis-classification rate is significantly reduced. Row (D) shows the segmentation results by using 24 landmark features in conjunction with the image features used for Row (B). It can be observed that the quality of the segmentation improves by using a combination of landmark features and image features. Furthermore, the quality of the segmentation also improves when applying more landmark features. To increase the number of landmark features, one may increase by identifying more landmark points, and/or define more landmark features with respect to each landmark point.

An accurately segmented image, or a well-defined contour of an anatomical structure may benefit various applications that rely on segmentation results. For example, FIG. 9 is a flow chart illustrating exemplary further applications of the segmentation results, according to some embodiments of the present disclosure.

1. Shape Modeling

Figure 9:
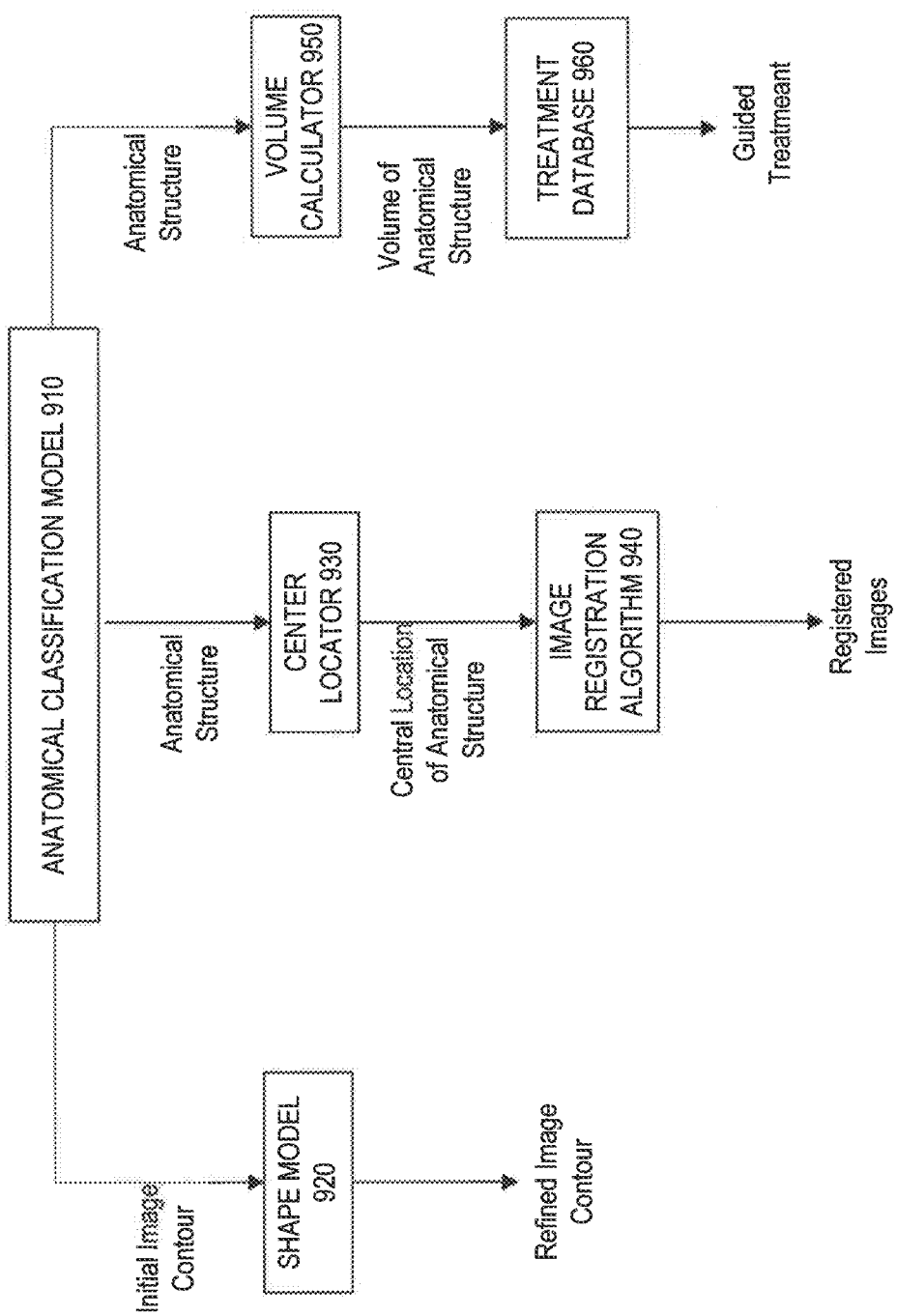
FIG. 9 is a flow chart illustrating exemplary further applications of the segmentation results, according to some embodiments of the present disclosure.

As shown in FIG. 9, classification model 910 may generate an initial image contour based on the classification results. The initial contour may be provided to shape model 920 for further refinement. Examples of shape model 920 may include, but not limited to, Active Shape Model (ASM), sparse shape models, physics-based shape models, etc.

In some embodiments, shape model 920 may iteratively deform the contour to fit to the objects (anatomical structures) in the medical image. For example, shape model 920 may first perform a profile modeling to determine a rough shape of the object, and then confirm the rough shape to the point distribution model, which restricts the way the shape may vary. Shape model 920 may alternate these steps until convergence. By using a high quality initial contour, shape model 920 may obtain a refined shape in fewer iterations, and thus less processing time.

2. Image Registration

As shown in FIG. 9, classification model 910 may provide an anatomical structure to assist image registration. Image registration is a process that transforms different sets of data into one coordinate system. Typical image registration algorithms are either intensity-based or feature-based, or the combination of the two. In particular, feature-based methods find correspondence between image features such as points, lines, and contours. Therefore, image registration can greatly benefit from a better-defined initial contour.

In some embodiments, classification model 910 may provide structure information to a center locator 930, which computes the central point location of the anatomical structure based on the anatomical classification results. Such information can be used to initialize or guide the computation of image registration algorithm 940. Examples of image registration algorithm 940 may include, but not limited to, rigid registration, affine registration, piece-wise linear registration and various deformable registration algorithms such as Demons registration, B-Spline registration, diffeomorphic registration etc. known to those of ordinary skill in the art.

In some other embodiments (not shown), classification model 910 may provide the anatomical classification results to refine the similarity or matching criterion in the optimization functions for image registration algorithms.

3. Volume Calculation

Anatomical classification results may also help generate accurate estimation of volume size of the anatomical structure. For certain anatomical structures, such as the bladder, volume sizes are important in calculating the deformation field and dose optimization for treatments. In the example of bladder, the volume sizes may change significantly at different treatment sessions. Therefore, accurate estimation of its size will give important prior knowledge about the relative locations or deformations around the bladder, and thus help calculate the deformation field or optimize dose distribution on the fly.

As shown in FIG. 9, classification model 910 may provide segmentation information related to an anatomical structure, such as the bladder, to volume calculator 950. Volume calculator 950 may compute the volume size of the anatomical structure based on its contour and other structural data. The volume size may be further provided to treatment database 960 to guide future treatments. For example, volume size information may be utilized to help guide the selection of similar patients from a database.

Various operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a method of operating a communication interface to send data via the communication interface. A machine or computer readable storage medium may cause a machine to perform the functions or operations described, and includes any mechanism that stores information in a form accessible by a machine (e.g., computing device, electronic system, and the like), such as recordable/non-recordable media (e.g., read only memory (ROM), random access memory (RAM), magnetic disk storage media, optical storage media, flash memory devices, and the like). A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present invention also relates to a system for performing the operations herein. This system may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer-implemented method for segmenting medical images, the method comprising:
    receiving an image acquired by an imaging device;
    identifying a plurality of landmark points within the image, each landmark point corresponding to a known anatomical landmark;
    selecting an image point in the image;
    determining, by a processor, at least one feature for the image point relative to the plurality of landmark points, wherein the at least one feature comprises a geometric measurement determined from a shape formed by the image point and the plurality of landmark points; and
    associating, by the processor, the image point with an anatomical structure by using a classification model based on the at least one determined feature.

2. The method of claim 1, wherein the geometric measurement includes an area or a volume determined from the shape formed by the image point and the plurality of landmark points.

3. The method of claim 1, wherein the at least one determined feature comprises a derived value based on at least one geometric measurement determined from a shape formed by the image point and the plurality of landmark points.

4. The method of claim 1, wherein each landmark point is associated with a different anatomical structure of the image.

5. The method of claim 1, further comprising generating a contour of the anatomical structure using the classification model.

6. The method of claim 1, wherein each landmark point is associated with a different anatomical structure of a training image.

7. A computer-implemented method for training a classification model used for segmenting medical images acquired by an imaging device, the method comprising:
    receiving a training image, the training image including a plurality of image points, each image point being assigned an anatomical structure;
    identifying a plurality of landmark points in the training image, each landmark point corresponding to a known anatomical landmark;
    determining one or more features for each image point in the training image relative to the landmark points, wherein at least one of the determined one or more features comprises a geometric measurement determined from a shape formed by the image point and the plurality of landmark points; and
    using the plurality of image points as training data to train the classification model, wherein the classification model associates an unclassified image point with an anatomical structure based on the one or more determined features for the unclassified image point.

8. The method of claim 7, wherein the plurality of image points are randomly selected within the training image.

9. The method of claim 7, wherein the geometric measurement includes an area or a volume determined from the shape formed by the image point and the plurality of landmark points.

10. The method of claim 7, wherein the at least one determined feature comprises a derived value based on at least one geometric measurement determined from a shape formed by the image point and the plurality of landmark points.

11. A non-transitory computer-readable medium storing computer-executable instructions that, when executed by a computer, cause the computer to perform a method for segmenting medical images, the method comprising:
    receiving an image acquired by an imaging device;
    identifying a plurality of landmark points within the image, each landmark point corresponding to a known anatomical landmark;
    selecting an image point in the image;
    determining at least one feature for the image point relative to the plurality of landmark points, wherein the at least one feature comprises a geometric measurement determined from a shape formed by the image point and the plurality of landmark points; and
    associating the image point with an anatomical structure by using a classification model based on the at least one determined feature.

12. The computer-readable medium of claim 11, wherein each landmark point is associated with a different anatomical structure of the image.

13. A non-transitory computer-readable medium storing computer-executable instructions that, when executed by a computer, cause the computer to perform a method for training a classification model used for segmenting medical images acquired by an imaging device, the method including:
    receiving a training image, the training image including a plurality of image points, each image point being assigned an anatomical structure;

identifying a plurality of landmark points in the training image, each landmark point corresponding to a known anatomical landmark;

determining one or more features for each image point in the training image relative to the landmark points, wherein at least one of the determined the one or more features comprises a geometric measurement determined from a shape formed by the image point and the plurality of landmark points; and using the plurality of image points as training data to train the classification model, wherein the classification model associates an unclassified image point with an anatomical structure based on the one or more determined features for the unclassified image point.

14. The computer-readable medium of claim 13, wherein the at least one determined feature comprises a derived value of the geometric measurement.

15. The computer-readable medium of claim 13, wherein each landmark point is associated with a different anatomical structure of the training image.

16. A system for segmenting medical images acquired by an imaging device using a classification model, the system comprising:

a database configured to store a plurality of images acquired by the imaging device; and an image processor connected to the database to access the plurality of images, image processor configure to:
receive an image from the database;
identify a plurality of landmark points within the image, each landmark point corresponding to a known anatomical landmark;
select an image point in the image;
determine at least one feature for the image point relative to the plurality of landmark points, wherein the at least one feature comprises a geometric measurement determined from a shape formed by the image point and the plurality of landmark points; and
associate the image point with an anatomical structure by using the classification model, based on the at least one determined feature.

17. A system for training a classification model used for segmenting medical images acquired by an imaging device, the system comprising:

a database configured store a plurality of training images, each training image including a plurality of image points and each image point is assigned an anatomical structure; and an image processor connected to the database to access the plurality of training images, the image processor configured to:
receive a training image from the database, the training image including a plurality of image points and each image point within the training image being assigned an anatomical structure;
identify a plurality of landmark points in the training image, each landmark point corresponding to a known anatomical landmark;
determine one or more features for each image point in the training image relative to the plurality of landmark points, wherein at least one of the determined one or more features comprises a geometric measurement determined from a shape formed by the image point and the plurality of landmark points; and
use the plurality of image points as training data to train the classification model, wherein the classification model associates an unclassified image point with an anatomical structure based on the one or more determined features for the unclassified image point.

* * * * *